(12) United States Patent
Cheng et al.

(10) Patent No.: US 8,897,118 B1
(45) Date of Patent: Nov. 25, 2014

(54) SINGLE CARRIER-FREQUENCY-DIVISION MULTIPLE ACCESS (SC-FDMA) PHYSICAL UPLINK CONTROL CHANNEL (PUCCH) 1/1A/1B DETECTION

(75) Inventors: Shi Cheng, Sunnyvale, CA (US); Ravi Narasimhan, Los Altos, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 876 days.

(21) Appl. No.: 13/023,641

(22) Filed: Feb. 9, 2011

Related U.S. Application Data (63) Continuation-in-part of application No. 12/848,043, filed on Jul. 30, 2010, now Pat. No. 8,416,759.

(51) Int. Cl.
*H04J 11/00* (2006.01)

(52) U.S. Cl.
USPC .......................................... 370/203; 370/343

(58) Field of Classification Search
None
See application file for complete search history.

(56) References Cited

U.S. PATENT DOCUMENTS

| | | | |
|---|---|---|---|
| 8,625,509 B2* | 1/2014 | Ahn et al. .................. | 370/329 |
| 2009/0147875 A1* | 6/2009 | Akita et al. ................ | 375/260 |
| 2010/0067632 A1 | 3/2010 | Jia | |
| 2010/0260118 A1 | 10/2010 | Taoka | |
| 2010/0290439 A1 | 11/2010 | Dai et al. | |
| 2010/0291937 A1 | 11/2010 | Hu et al. | |
| 2010/0303035 A1 | 12/2010 | Gao et al. | |
| 2010/0311437 A1 | 12/2010 | Palanki et al. | |
| 2010/0322114 A1 | 12/2010 | Li et al. | |
| 2011/0190005 A1* | 8/2011 | Cheon et al. ............... | 455/456.1 |
| 2011/0228748 A1* | 9/2011 | Han et al. ................... | 370/335 |

OTHER PUBLICATIONS

A.D. Dabbagh, R. Ratasuk, A. Ghosh, On UMTS-LTE Physical Uplink Shared and Control Channels, IEEE Vehicular Technology Conference, 2008, VTC 2008-Fall.

H.Yang, D. Astely, R. Baldernair, S. Falahati, Semi-Blind Multi-User Detection for LTE PUCCH, IEEE Wireless Communications and Networking Conference, 2009.

M.R. Raghavendra, S. Nagaraj, K.V. Pradap, P. Fleming, Robust Channel Estimation and Detection for Uplink Control Channel in 3GPF-LTE, IEEE Global Telecommunications Conferen, 2009.

I. L. J. Da Silva, et al.; Improved Data-Aided Channel Estimation in LTE PUCCH Using a Tensor Modeling Approach; IEEE ICC; 2010; 5 pages, GTEL-Wireless Telecom Research Group, Federal University of Ceara; Fortaleza, Brazil.

I. L. J. Da Silva, et al.; A New Multi-User Receiver for PUCCH LTE Format 1 in Non-Cooperative Multi-Cell Architectures; IEEE; 2010; 5 pages; GTEL-Wireless Telecom Research Group, Federal University of Ceara, Fortaleza, Brazil.

* cited by examiner

*Primary Examiner* — Alex Skripnikov
(74) *Attorney, Agent, or Firm* — Amin, Turocy & Watson, LLP (57) ABSTRACT

A method is provided for Single Carrier-Frequency-Division Multiple Access (SC-FDMA) Physical Uplink Control Channel (PUCCH) format 1/1a/1b detection in a wireless communications receiver. The receiver accepts a plurality of multicarrier signals transmitted simultaneously from a plurality of transmitters, with overlapping carrier frequencies. For each multicarrier signal, a single tap measurement of time delay is performed using a Direction of Arrival (DoA) technique. In response to the single tap measurements, PUCCH 1/1a/1b format signals are detected. Prior to performing the single tap measurements, the multicarrier signals are decorrelated in the time domain, using corresponding orthogonal code covers. Subsequent to the single tap measurements, each multicarrier signal is decorrelated in the frequency domain, using a corresponding cyclic shift. Subsequent to decorrelating the multicarrier signals in the frequency domain, a Generalized Likelihood Ratio Test (GLRT) is performed for each decorrelated multicarrier signal.

23 Claims, 8 Drawing Sheets

SINGLE CARRIER-FREQUENCY-DIVISION MULTIPLE ACCESS (SC-FDMA) PHYSICAL UPLINK CONTROL CHANNEL (PUCCH) 1/1A/1B DETECTION

RELATED APPLICATIONS

This application is a continuation-in-part of a pending application entitled, CARRIER FREQUENCY OFFSET AND DOPPLER FREQUENCY ESTIMATION AND CORRECTION FOR OFDMA AND SC-FDMA, invented by Ravi Narasimhan et al., Ser. No. 12/848,043, filed Jul. 30, 2010 now U.S. Pat. No. 8,416,759, which is incorporated herein by reference.

BACKGROUND OF THE INVENTION

1. Field of the Invention

This invention generally relates to Single Carrier Frequency Division Multiple Access (SC-FDMA) communications, and more particularly, to system and method for detecting signals in the Physical Uplink Control Channel PUCCH 1/1a/1b format.

2. Description of the Related Art

UL: Uplink

LTE: Long Term Evolution (3GPP term for next-generation cellular standard)

OFDMA: Orthogonal Frequency Division Multiple Access

SC-FDMA: Single Carrier Frequency Division Multiple Access

MIMO: Multiple-Input Multiple-Output

MU-MIMO: Multi-user Multiple Input Multiple Output

DoA: Direction of Arrival

TO: Timing Offset

ACK: Acknowledgement

NACK: Negative Acknowledgement

DTX: Discontinued Transmission

SR: Scheduling Request

SRS: Sounding Reference Signals (used to sound the frequency band)

AWGN: Additive White Gaussian Noise eNodeB: Enhanced NodeB (LTE base station)

CQI: channel Quality Indicator

RI: Rank Indicator

UE: User Equipment

UCI: Uplink Control Information

PUCCH: Physical Uplink Control Channel

PUSCH: Physical Uplink Shared Channel

RB: Resource Block

Figure 1:
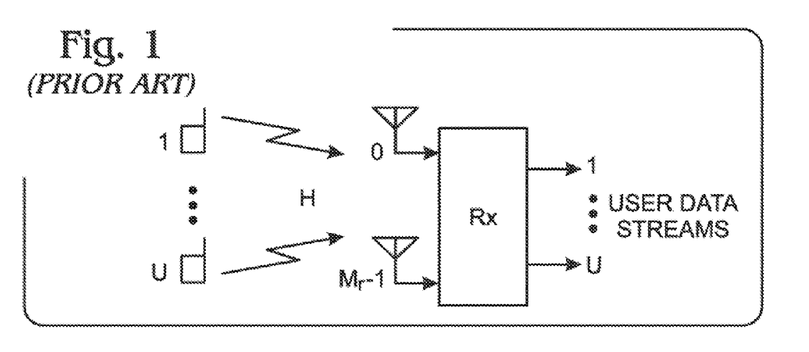
FIG. 1 is a diagram depicting a Multiuser MIMO (MU-MIMO) wireless communication system (prior art).

FIG. 1 is a diagram depicting a Multiuser MIMO (MU-MIMO) wireless communication system (prior art). Multiple users can transmit data simultaneously at the same frequency to a multi-antenna base station, resulting in increased aggregate cell throughput. There is a need to decouple data streams from different users via MU-MIMO equalization, which requires MU-MIMO channel estimation.

Figure 2:
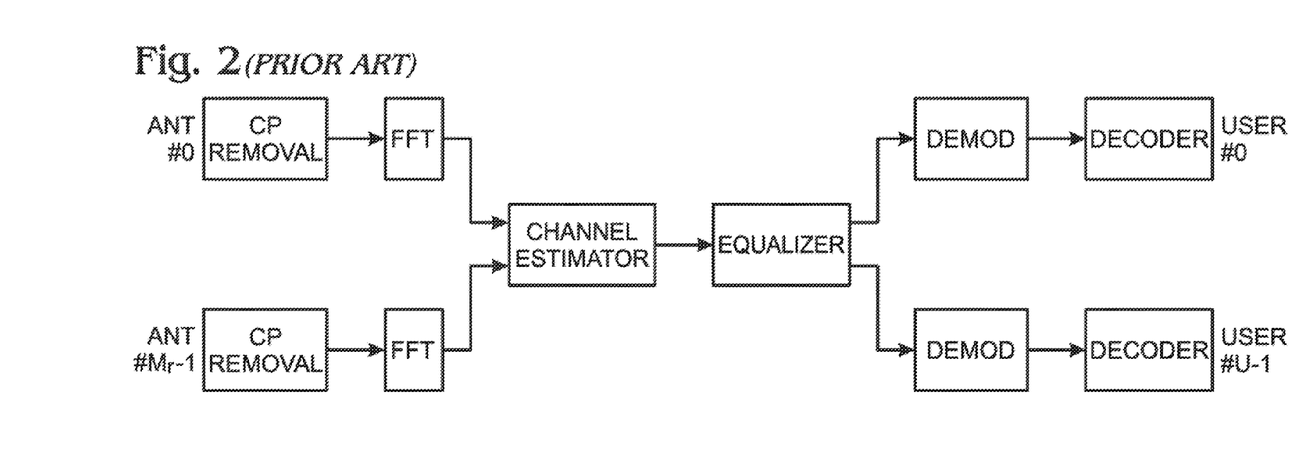
FIG. 2 is a diagram depicting an exemplary MIMO receiver (prior art).

FIG. 2 is a diagram depicting an exemplary MIMO receiver (prior art). Channel estimation is needed in multi-user and single-user MIMO receivers to separate different spatial streams and/or user signals via equalization. Of special interest is OFDMA and SC-FDMA multi-user MIMO channel estimation with a single spatial stream per user (e.g., LTE uplink). After cyclic prefix (CP) removal and a fast Fourier transform (FFT), the input to the channel estimator block is the received frequency domain signal of reference symbols from Mr number of receive antennas. The outputs are channel responses in the frequency domain from user u ($1 \leq u \leq U$) to antenna m ($0 \leq m \leq Mr-1$) are demodulated (demod) and decoded.

Figure 3:
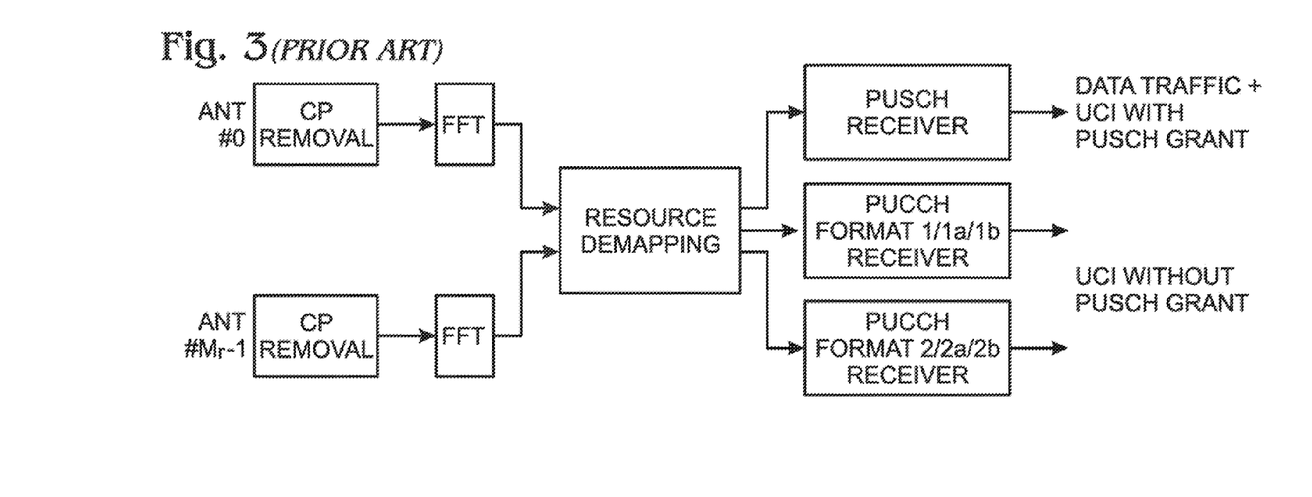
FIG. 3 is a schematic block diagram of a MIMO receiver differentiating between data and control channel receiver functions (prior art).

FIG. 3 is a schematic block diagram of a MIMO receiver differentiating between data and control channel receiver functions (prior art). PUCCH in LTE carries uplink control information (UCI), such as CQI, RI, ACK/NACK, and SR. Each user (UE) has a PUSCH grant, CQI, RI, ACK/NACK are multiplexed, with or without data traffic, on PUSCH. Otherwise, they are sent on PUCCH. PUCCH is the uplink control channel in LTE, in which each UE sends SR or ACK/NACK to a downlink traffic node. Different users may be multiplexed on the same resource block RB pairs in an orthogonal way. However, the orthogonality may be lost due to each user's timing offset and multipath fading channel.

Most of the current methods ignore different users' timing offsets. Although each user's signal is decorrelated and detected, the desired signal may be degraded by other user signals because the orthogonality is lost at the receiver side. There are methods that attempt to estimate the multipath path channel per user. However, the estimation requires knowledge of channel covariance matrix, which is generally unknown. With a large number of multiplexed users, the estimation becomes very complicated.

Figure 4:
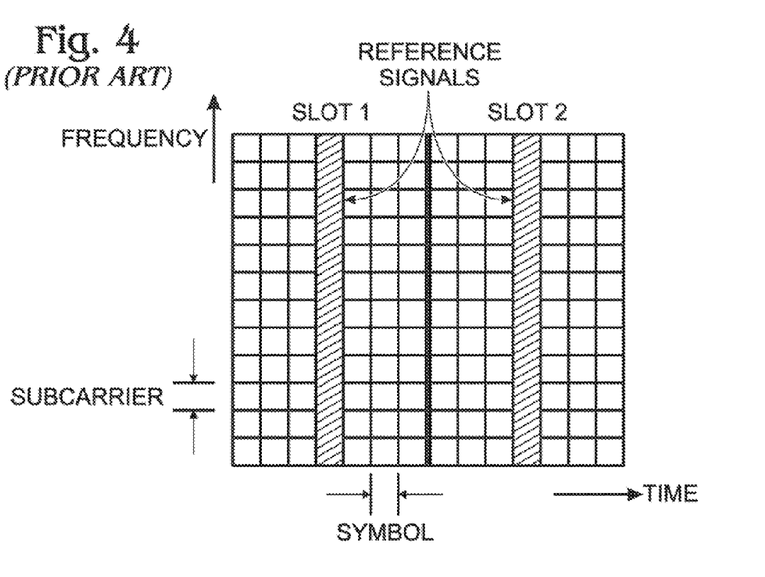
FIG. 4 is a diagram depicting a subframe consisting of two slots, as is used in Long Term Evolution (LTE) (prior art).

FIG. 4 is a diagram depicting a subframe consisting of two slots, as is used in Long Term Evolution (LTE) (prior art). LTE is the Third Generation Partnership Program (3GPP) term for the next generation cellular standard. The figure shows two resource blocks (RBs), with one resource block per slot. Each slot includes seven OFDMA or SC-FDMA symbols for normal CP, or 6 symbols for extended CP, at twelve subcarrier frequencies. In OFDMA and SC-FDMA, each user is allocated resource elements (REs) in time and frequency. SC-FDMA is similar to OFDMA except that user data are spread via a discrete Fourier transform (DFT) before OFDMA modulation. Each resource element consists of 1 subcarrier in the frequency domain and 1 OFDMA or SC-FDMA symbol in the time domain. User data modulates the amplitude and phase of each subcarrier for the duration of 1 OFDMA or SC-FDMA symbol. Multiple users can modulate the same RE (MU-MIMO). In the LTE uplink, each user transmits reference signals on all REs of specified symbols. Different user reference signals are multiplexed using different cyclic shifts. The base station uses the reference signals to estimate a channel for each user.

SC-FDMA is a multi-user version of a single carrier frequency domain multiplexing modulation scheme. SC-FDMA can be viewed as a linearly precoded OFDMA scheme, henceforth LP-OFDMA. FDE is the equalizer at receiver end. It is different from the modulation scheme. Or, it can be viewed as a single carrier multiple access scheme. Just like in OFDM, guard intervals with cyclic repetition are introduced between blocks of symbols in view to efficiently eliminate time spreading (caused by multi-path propagation) among the blocks. In OFDM, a Fast Fourier transform (FFT) is applied on the receiver side on each block of symbols, and inverse FFT (IFFT) on the transmitter side. In SC-FDMA, both FFT and IFFT are applied on the transmitter side, and also on the receiver side.

In OFDM as well as SC-FDMA, equalization is achieved on the receiver side after the FFT calculation, by multiplying each Fourier coefficient by a complex number. Thus, frequency-selective fading and phase distortion can be combated. The advantage is that FFT and frequency domain equalization requires less computation power than conventional time-domain equalization. In SC-FDMA, multiple access is made possible by inserting Fourier-coefficients on the transmitter side before the IFFT, and removing them on the receiver side after the FFT. Different users are assigned to different Fourier-coefficients (sub-carriers).

LTE uses OFDMA for the downlink—that is, from the base station to the terminal. In the time domain the radio frame is 10 ms long and consists of 10 sub frames of 1 ms each. In LTE with frequency-division duplexing (FDD), every sub frame consists of 2 slots where each slot is 0.5 ms. The subcarrier spacing in the frequency domain is 15 kHz and there are modes with 7.5 kHz subcarrier spacing. In the 15 kHz mode, twelve of these subcarriers together (per slot) are called a resource block, so one resource block is 180 kHz. 6 Resource blocks fit in a carrier of 1.4 MHz and 100 resource blocks fit in a carrier of 20 MHz. In the uplink, for the Physical Uplink Shared channel (PUSCH) only, LTE uses a pre-coded version of OFDMA called SC-FDMA to compensate for a drawback with normal OFDMA, which has a very high peak-to-average power ratio (PAPR). High PAPR requires expensive and inefficient power amplifiers with high requirements on linearity, which increases the cost of the terminal and drains the battery faster. SC-FDMA solves this problem by grouping together the resource blocks in a way that reduces the need for linearity, and so power consumption, in the power amplifier. A low PAPR also improves coverage and the cell-edge performance.

In MIMO systems, a transmitter sends multiple streams by multiple transmit antennas. The transmit streams go through a matrix channel which consists of all paths between the transmit antennas at the transmitter and receive antennas at the receiver. Then, the receiver gets the received signal vectors by the multiple receive antennas and decodes the received signal vectors into the original information. A narrowband flat fading MIMO system is modeled as:

$$y=Hx+n$$

where y and x are the receive and transmit vectors, respectively, and H and n are the channel matrix and the noise vector, respectively. Where x is a $M_t \times 1$ vector, y and n are $M_r \times 1$ vectors.

With respect to MU-MIMO channel estimation for OFDMA/SC-FDMA, user reference signals with different cyclic shifts are orthogonal across a number of tones in ideal scenarios (no timing offset and low delay spread). In this case, channel estimation for each user is decoupled. Several channel estimation techniques exist in prior art, such as least squares, minimum mean-square error (MMSE), discrete cosine transform (DCT), can be used under the orthogonality assumption. In practice, orthogonality is destroyed because of different user timing offsets and/or medium to high delay spreads.

Figure 5:
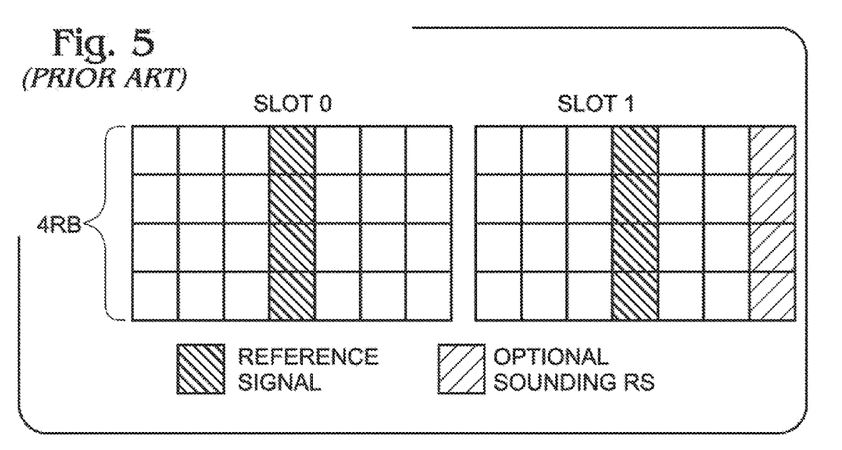
FIG. 5 is a drawing depicting uplink reference signals in LTE (normal cyclic prefix) (prior art).

FIG. 5 is a drawing depicting uplink reference signals in LTE (normal cyclic prefix) (prior art). The reference signals of the different users are orthogonal across a number of tones if the same base sequence is used and each user applies a unique cyclic shift. The demodulation reference signal (DM-RS) for each slot is assigned SC-FDMA symbol index 0. The DM-RS symbol is the phase reference since the equalizer is computed at the DM-RS symbol. Thus, degradation from phase rotation is worse for constellations in symbols further in time from the DM-RS symbol. The duration of each SC-FDMA symbol is Tsym. The duration of each slot is Tslot.

It would be advantageous if the orthogonality between users in PUCCH protocol transmissions could be compensated for by initially estimating each user's timing offset, and using the estimated timing offsets for decorrelation.

SUMMARY OF THE INVENTION

Described herein is a process that uses Direction of Arrival (DoA) timing offset estimation, implicit channel response estimation using both pilot and data symbols, and a generalized likelihood ratio test that leads to better error rate performance, with a relatively low level of complexity. Conventional methods typically ignore the different users' timing offsets. Although each user's signal is decorrelated and detected, the desired signal may be degraded because of the loss of orthogonality between signals. The process described herein estimates each user's timing offset first, and then decorrelates each user's signal given the estimated timing offset. The channel response per user is estimated implicitly with both pilot and data symbols, and then detection is done based a generalized likelihood ratio test. The disclosed process can be used in a Long Term Evolution (LTE) eNodeB receiver such that lower miss detection and false alarm of ACK/NACK and SR can be achieved in the uplink. The disclosed process can be used in current, Release 8, Release 9, and future LTE advanced standards (e.g., LTE Release 10 and beyond).

Accordingly, a method is provided for Single Carrier-Frequency-Division Multiple Access (SC-FDMA) Physical Uplink Control Channel (PUCCH) format 1/1a/1b detection in a wireless communications receiver. The receiver accepts a plurality of multicarrier signals transmitted simultaneously from a plurality of transmitters, with overlapping carrier frequencies. For each multicarrier signal, a single tap measurement of time delay is performed using a DoA technique. In response to the single tap measurements, PUCCH 1/1a/1b format signals are detected.

Prior to performing the single tap measurements, the multicarrier signals are decorrelated in the time domain, using corresponding orthogonal code covers. Subsequent to the single tap measurements, each multicarrier signal is decorrelated in the frequency domain, using a corresponding cyclic shift. Subsequent to decorrelating the multicarrier signals in the frequency domain, a Generalized Likelihood Ratio Test (GLRT) is performed for each decorrelated multicarrier signal.

Additional details of the above-described detection method, and a wireless communications receiver with a system for Single Carrier-Frequency-Division Multiple Access (SC-FDMA) Physical Uplink Control Channel (PUCCH) format 1/1a/1b detection, are provided below.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The receiver devices described below typically employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 6:
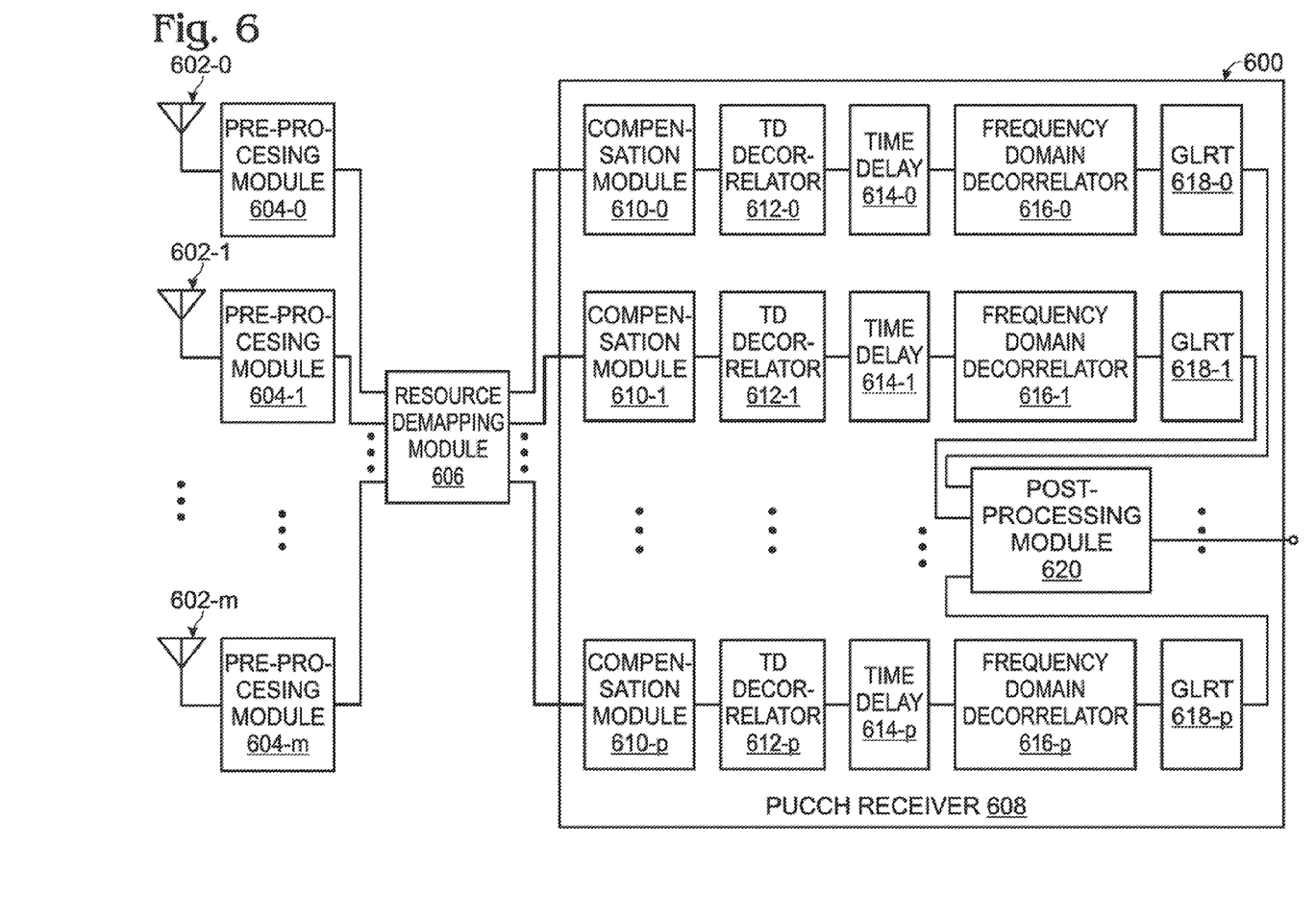
FIG. 6 is a schematic block diagram of a wireless communications receiver with a system for Single Carrier-Frequency-Division Multiple Access (SC-FDMA) Physical Uplink Control Channel (PUCCH) format 1/1a/1b detection.

FIG. 6 is a schematic block diagram of a wireless communications receiver with a system for Single: Carrier-Frequency-Division Multiple Access (SC-FDMA) Physical Uplink Control Channel (PUCCH) format 1/1a/1b detection. The system 600 comprises a plurality of antennas 602 accepting a plurality of multicarrier signals transmitted simultaneously from a plurality of transmitters, with overlapping carrier frequencies. Shown are antennas 602-0 through 602-m, where m is an integer value not limited to any particular value. Also shown is a plurality of pre-processing modules 604-0 through 604-m, each connected to a corresponding antenna 602 to perform cyclic prefix (CP) removal and a fast Fourier transform (FFT) for each multicarrier signal. A resource demapping module 606 is connected to the pre-processing modules 604 and has an output connected to a PUCCH receiver 608.

The PUCCH receiver 608 includes a plurality of compensation modules 610-0 through 610-p, for compensating cyclic shift and reference signal. A plurality of time domain (TD) decorrelators 612-0 through 612-p is shown, each connected to a corresponding compensation module 610. A plurality of single tap time delay estimators 614-0 through 614-p is shown, each connected to a corresponding time domain decorrelator 612. Each single tap time delay estimator 614 performs a single tap measurement of time delay for a corresponding multicarrier signal using a Direction of Arrival (DOA) technique.

A plurality of frequency domain decorrelators 616-0 through 616-p is shown, each connected to a corresponding single tap time delay estimator 614. A plurality of Generalized Likelihood Ratio Test (GLRT) modules 618-0 through 618-p is, each connected to a corresponding frequency domain decorrelator 616. A post-processing module 620 is connected to each GLRT module 618 and has an output to supply detected PUCCH 1/1a/1b format signals.

Each time domain decorrelator 612 decorrelates a resource block (RB) pair, associated with a corresponding multicarrier signal, in the time domain, using a corresponding orthogonal code cover. Orthogonal cover codes are explained in more detail below. Likewise, each frequency domain decorrelator 616-0 decorrelates a corresponding RB pair in the frequency domain, using a corresponding cyclic shift. The cyclic shift is described in more detail below.

Each single tap time delay 614 uses one of the following DoA techniques: classis beamforming, Capon beamforming, MUltiple SIgnal Classification (MUSIC), estimation of signal parameters via rotational invariance techniques (ESPRIT), alternating projection, or simplified projection.

In one aspect, each mth antenna 602 is assigned to a signal of one slot on the mth antenna, kth frequency tone, and ith SC-FDMA symbol as follows:

$$v_m(k, i) = \sum_{u=0}^{U-1} H_m^{(u)}(k, i) e^{j2\pi k \Delta_f (\Delta^{(u)} + \Delta_{cell}(i))/12} w^{(u)}(i) s^{(u)}(i) r_{rs}(k) + n_m(k, i)$$

where U is the number of multiplexed users;

$H_m^{(u)}(k,i)$ is the channel response on the kth tone of the uth user at the ith symbol on the mth antenna;

$\Delta_{cell}(i)$ is the cell specific cyclic shift on the ith symbol;

$r_{rs}(k)$ is the reference signal on the kth tone;

$\Delta_f$ is the subcarrier spacing, 15 KHz; and, $w^{(u)}(i)$ is the orthogonal code on the ith symbol.

In another aspect, each single tap time delay estimator 614 approximates a multicarrier signal as follows:

$$z_{m,n,data} = A_n H_{m,n} s_{data} + n_{m,n,data}$$

$$z_{m,n,pilot} = A_n H_{m,n} s_{pilot} + n_{m,n,pilot}$$

where $$A = \left[a\left(\tau^{(u_0)}\Delta_f - \frac{\Delta^{(u_0)}}{12}\right), \ldots, a\left(\tau^{(u_{K-1})}\Delta_f - \frac{\Delta^{(u_{K-1})}}{12}\right)\right]$$

$$a(t) = [1\ e^{-j2\pi t} \ldots e^{-j2\pi 11 t}]^T$$

where the subscript n denotes the index of the orthogonal code cover, $u_0, \ldots, u_{K-1}$ are user indexes under the nth orthogonal code cover;

where A includes steering vectors corresponding to user $u_0, \ldots, u_{K-1}$;

where $H_{m,n}$ is a diagonal matrix whose elements are the single tap channel responses on the mth antenna of user $u_0, \ldots, u_{K-1}$;

where a(t) is a length 12 steering vector where $\tau$ is a tap delay of a particular user where $\Delta$ is a cyclic shift of a particular user;

where $S_{data}$ and $s_{pilot}$ are transmitted data and pilots, respectively, from user $u_0, \ldots, u_{K-1}$; and, where $n_{m,n,data}$ and $n_{m,n,pilot}$ are interference and noise vectors on data symbols and pilot symbols, respectively, of the mth antenna and nth orthogonal code cover, respectively.

In one aspect, each GLRT module 618 calculates as follows:

$$L = \log \frac{\max_{H, s_{pilot}=1, s_{data} \in \chi_S} p(Y \mid H, s_{pilot}, s_{data})}{p(Y \mid s_{pilot} = s_{data} = 0)}$$

and, after simplification:

$$L = \max_{s_{pilot}=1, s_{data} \in \chi_S} \frac{\|Y^H S\|^2}{\|S\|^2 N_0}; \text{ and,}$$

wherein each GLRT module computes for hypothesis tests $H_D$ and $H_{ND}$:

$$Y = SH + \text{noise}$$

where $$Y = \begin{bmatrix} y^{(u)}_{0,data,s_0} & \cdots & y^{(u)}_{M-1,data,s_0} & y^{(u)}_{0,data,s_1} & \cdots & y^{(u)}_{M-1,data,s_1} \\ y^{(u)}_{0,pilot,s_0} & \cdots & y^{(u)}_{M-1,data,s_0} & y^{(u)}_{0,data,s_1} & \cdots & y^{(u)}_{M-1,data,s_1} \end{bmatrix}$$

$$S = \begin{bmatrix} s^{(u)}_{data} \\ s^{(u)}_{pilot} \end{bmatrix}$$

$$H = [h_{0,s_0}^{(u)} \ldots h_{M-1,s_0}^{(u)}\ h_{0,s_1}^{(u)} \ldots h_{M-1,s_1}^{(u)}]$$

$$H_D : s_{pilot}^{(u)} = 0, s_{data}^{(u)} = 0$$

$$H_{ND} : s_{pilot}^{(u)} = 1, s_{data}^{(u)} \in \chi_s$$

where $y_{m,data,s_i}^{(u)}$ and $y_{m,pilot,s_i}^{(u)}$ are decorrelated data and pilot symbols on the mth antenna in slot i, respectively, and the post-processing module 620 detects PUCCH 1/1a/1b signals as a discontinuous transmission (DTX) if L is less than a threshold $\gamma$. Otherwise, $s_{data}$ achieving the maximum L is detected as the transmitted signal.

In another aspect, each single tap time delay estimator 614 uses the classic beamforming algorithm by building statistics for slot pairs, using decoupled data and pilot signal from a corresponding antenna 602, as follows:

$$\tilde{Z}_n = [z_{0,n,pilot}, z_{1,n,pilot}, \ldots, z_{M-1,n,pilot}, \ldots, z_{0,n,data}, z_{1,n,data}, \ldots, z_{M-1,n,data}]$$

computing metrics $$\lambda_n^{(u)}(\tau) = \left\|\tilde{Z}_n a^H\left(\tau\Delta_f - \frac{\Delta^{(u)}}{12}\right)\right\|^2,$$

where a is the steering vector;

peak picking to estimate $\tau^{(u)}$ using computed spectrums from both slot within a given range $$\hat{\tau}^{(u)} = \arg\max_{\tau \in [\tau_{min}, \tau_{max}]} \lambda_{n_0, s_0}^{(u)}(\tau) + \lambda_{n_1, s_1}^{(u)}(\tau)$$

where the subscripts $s_0$ and $s_1$ represents slot 0 and slot 1, and $n_0$ and $n_1$ are user u's orthogonal code cover indexes in slot 0 and slot.

In one aspect, each single tap time delay estimator 614 uses the alternating projection algorithm by building statistics a corresponding slot pairs, using decoupled data and pilot signal from a corresponding antenna 602, as follows:

for each user, set initial estimates to $\hat{\tau}^{(u)}$;

iteratively update each user's estimate $$\hat{\tau}^{(u)} = \arg\max_{\tau \in [\tau_{min}, \tau_{max}]} \lambda_{n_0, s_0}^{(u)}(\tau) + \lambda_{n_1, s_1}^{(u)}(\tau)$$

where the subscripts $s_0$ and $s_1$ represents slot 0 and slot 1, and $n_0$ and $n_1$ are user u's orthogonal code cover indexes in slot 0 and slot;

computing a spectrum, per slot, based on steering vectors projected onto the null space of $$\left\{a\left(\tau^{(\tilde{u}_0)}\Delta_f - \frac{\Delta^{(\tilde{u}_0)}}{12}\right), \ldots, a\left(\tau^{(\tilde{u}_0)}\Delta_f - \frac{\Delta^{(\tilde{u}_{K-2})}}{12}\right)\right\}$$

where $\tilde{u}_0, \ldots, \tilde{u}_{K-2}$ are all users under orthogonal cover n, but excluding u given $$\tilde{A}_u = [a(\hat{\theta}_0), \ldots, a(\hat{\theta}_{u-1}), a(\hat{\theta}_{u+1}), \ldots, a(\hat{\theta}_{U-1})]$$

where $$\hat{\theta}_k = \hat{\tau}^{(k)}\Delta_f - \frac{\Delta^{(k)}}{12}$$

computing a projection matrix $$_u = I - \tilde{A}_u(\tilde{A}_u^H \tilde{A}_u)^{-1}\tilde{A}_u^H$$

projecting and normalizing a steering vector $$b_u(\theta) = \frac{P_u a(\theta)}{\|P_u a(\theta)\|}$$

computing $$\lambda^{(u)}(\tau) = \left\| \check{Z} b_u^H \left( \tau \Delta_f - \frac{\Delta^{(u)}}{12} \right) \right\|^2;$$

and updating $\hat{\tau}^{(u)}$; and, repeating the above-listed steps until a stopping criteria is met.

In another aspect, each single tap time delay estimator 614 uses the simplified projection algorithm by building statistics for a corresponding slot pair, using decoupled data and pilot signal from a corresponding antenna 602, as follows:

set a common initial estimate for each user;

for each user, using the simplified projection method to estimate $\hat{\tau}^{(u)}$, given initial estimates $$b_u(\theta) = \frac{P_u a(\theta)}{\|P_u a(\theta)\|}$$

$$P_u = I - \tilde{A}_u (\tilde{A}_u^H \tilde{A}_u)^{-1} \tilde{A}_u^H$$

where $\tilde{A}_u$ has orthogonal rows and $\tilde{A}_u^H \tilde{A}_u$ is a simple identity matrix.

In one aspect, the post-processing module 620 detects signals for each user that are either both ACK/NACK and SR, or multiple ACK/NACKs, where no more than one non-DTX symbol can be sent over multiple allocations. Then, the post processing module compares the generalized likelihood ratios from all possible allocations computed by GLRT modules 618, selects the maximum generalized likelihood ratio, and compares it to a threshold. If the maximum generalized likelihood ratio is less the threshold, all possible allocations are detected as DTX. Otherwise, the allocation corresponding to the maximum generalized likelihood ratio is detected as non DTX, and $s_{data}$ achieving the maximum generalized likelihood ratio is detected as the transmitted signal.

Functional Description

Figure 7:
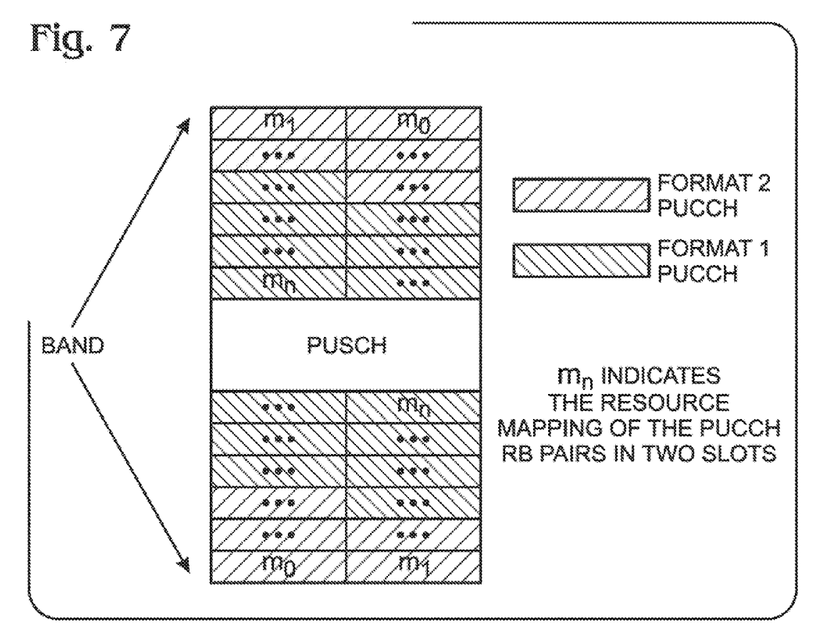
FIG. 7 is a schematic diagram depicting PUCCH resource block allocation.

FIG. 7 is a schematic diagram depicting PUCCH resource block allocation. Allocation per RB pair, always occurs on the edges of the band. From the edges, format 2/2a/2b is allocated first, then format 1/1a/1b. Format 1 schedules requests (On/Off). Format 1a comprises a 1-bit ACK/NACK. Format 1b comprises a 2-bit ACK/NACK. Format 2, normal CP, comprises CQI (up to 11 bits), while extended CP comprises CQI (up to 11 bits) and ½ bits of ACK/NACK. Format 2a, normal CP, comprises CQI (up to 11 bits) and 1 bit of ACK/NACK. Format 2b, normal CP, comprises CQI (up to 11 bits) and 2 bits of ACK/NACK.

Table 1 summarizes the differences between the PUCCH format 1/1a/1b format signals.

TABLE 1

|  | Data | Pilot |
|---|---|---|
| Format 1/1a/1b DTX | 0 | 0 |
| Format 1 non DTX | 1 | 1 |
| Format 1a non DTX | {1, −1} | 1 |
| Format 1b non DTX | {1, −1, j, −j} | 1 |

Modulation from SR or ACK/NACK to pilot and data involves a 90 degree rotation on alternate allocations. After applying orthogonal code cover in the time domain, data and pilot symbols are spread in frequency domain by a particular cyclic shift per slot. Length 12 reference signals are multiplied in frequency domain. Both cyclic shift and reference signal may vary over slots. SRS may have a higher priority than PUCCH format 1/1a/1b, resulting in a shortened version PUCCH format 1/1a/1b.

Figure 8:
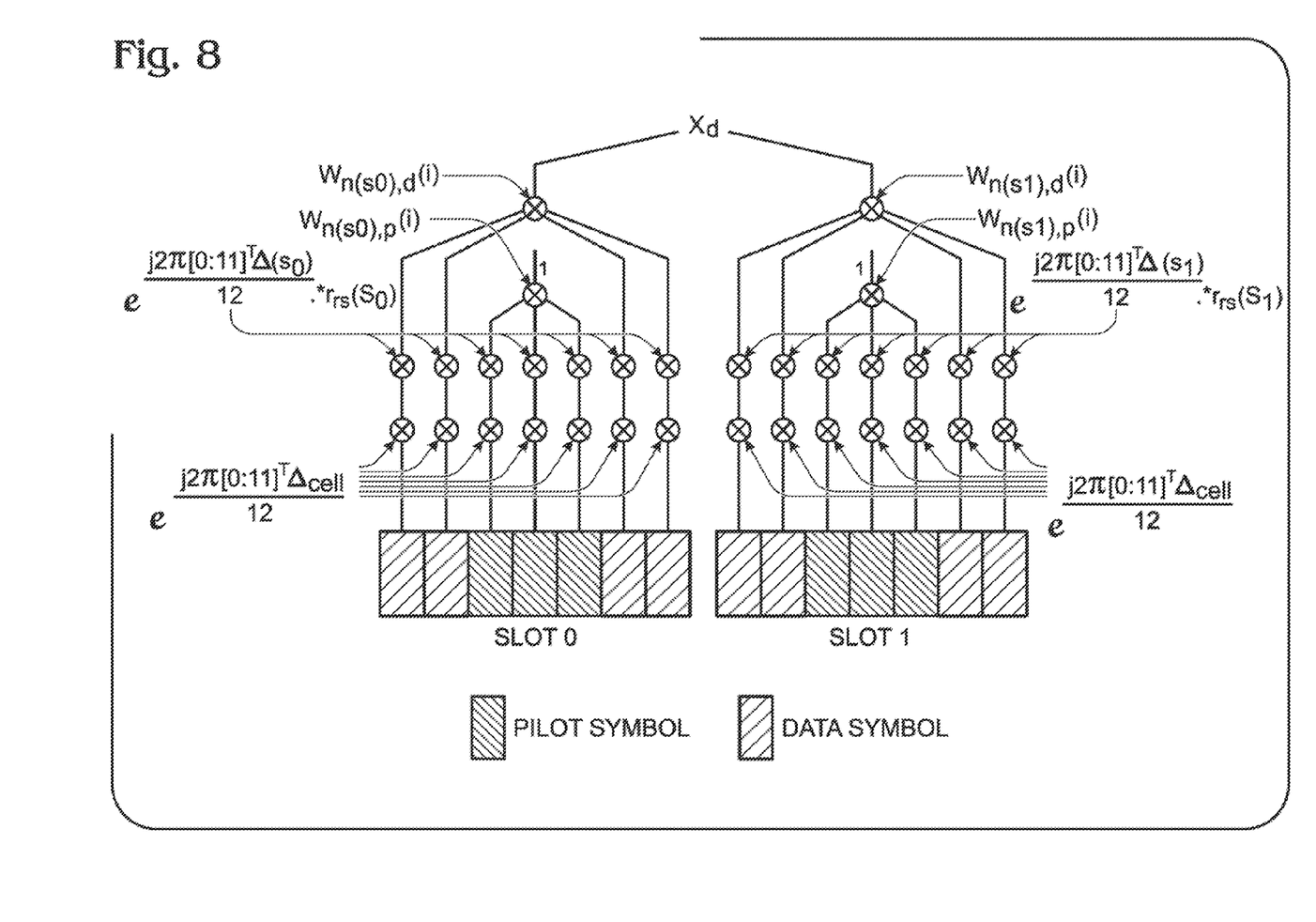
FIG. 8 is a diagram depicting PUCCH format 1/1a/1b decorrelation with normal CP.

FIG. 8 is a diagram depicting PUCCH format 1/1a/1b decorrelation with normal CP.

Figure 9:
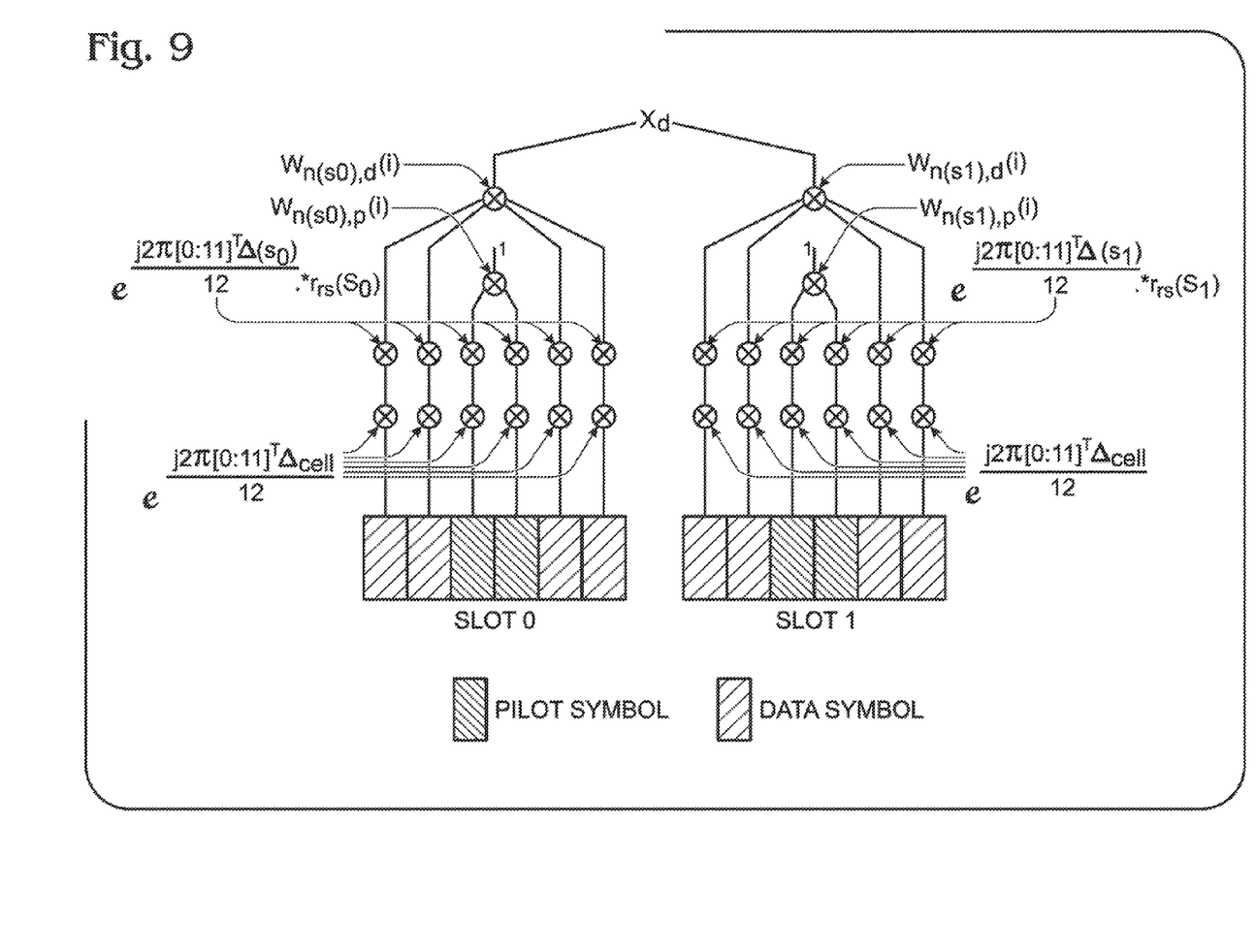
FIG. 9 is a diagram depicting PUCCH format 1/1a/1b decorrelation with extended CP.

FIG. 9 is a diagram depicting PUCCH format 1/1a/1b decorrelation with extended CP.

Figure 10A:
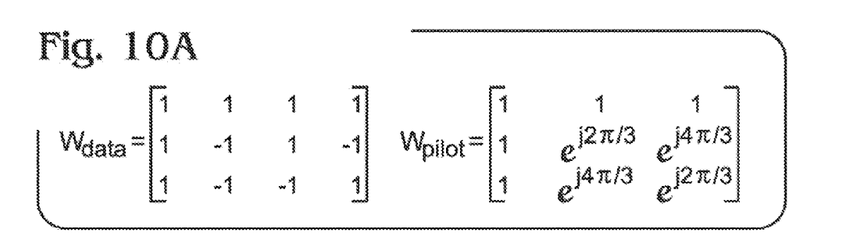
FIGS. 10A and 10B depict PUCCH 1/1a/1b orthogonal code covers.
Figure 10B:
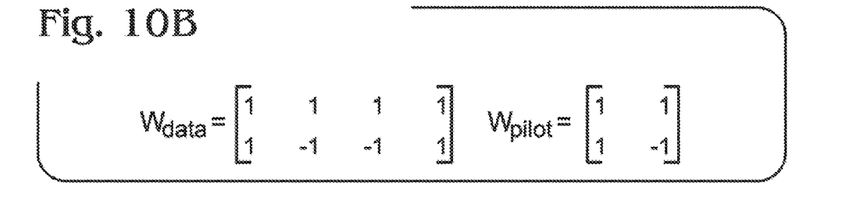

FIGS. 10A and 10B depict PUCCH 1/1a/1b orthogonal code covers. PUCCH resources are sliced based on both orthogonal codes and cyclic shifts. As seen in FIG. 10A, there are three orthogonal code covers for normal CP, with 12 cyclic shifts. As shown in FIG. 10B, there are two orthogonal code covers for extended CP, with 12 cyclic shifts. PUCCH allocation can take 1 out of $\Delta_{PUCCH}$ cyclic shifts, where $\Delta_{PUCCH}$ equals 1, 2, or 3.

Figure 11:
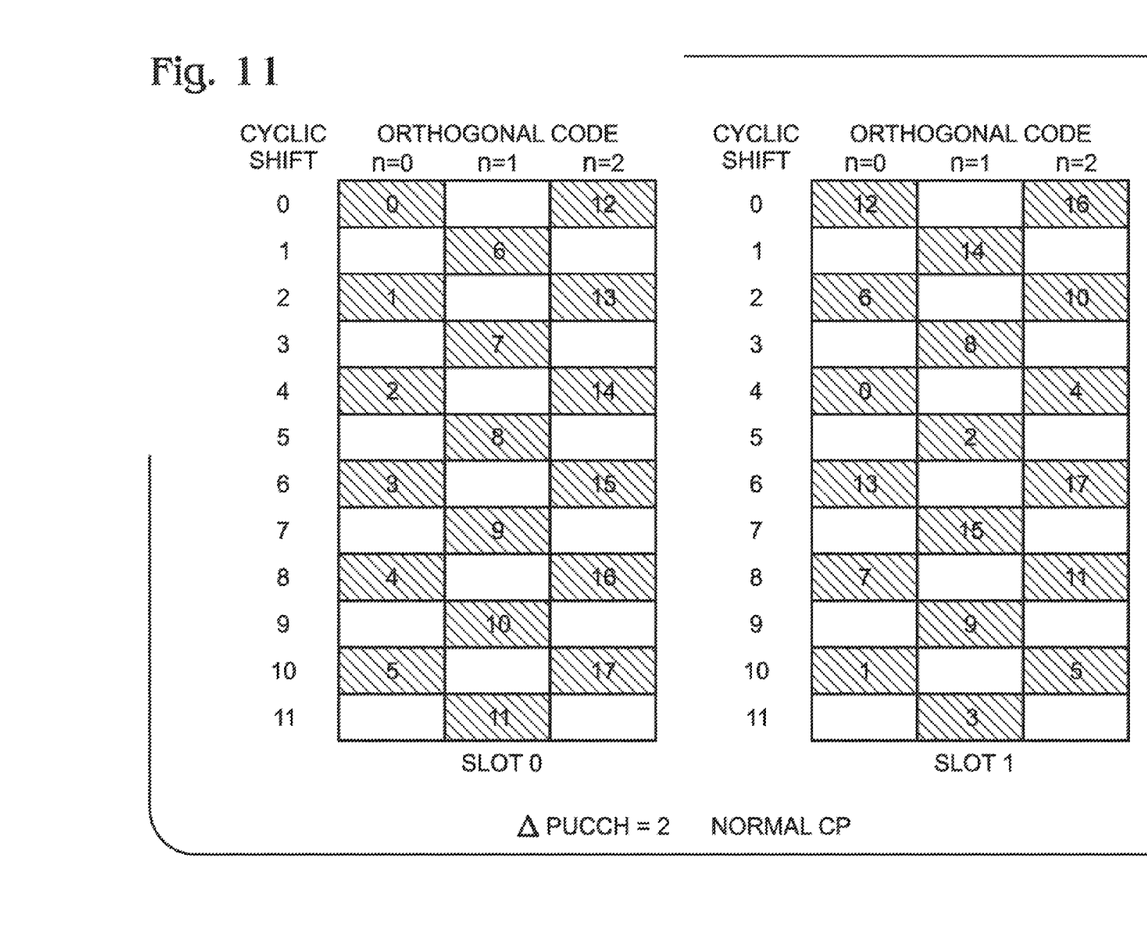
FIG. 11 is a diagram depicting PUCCH 1/1a/1b resource allocation for normal CP, where $\Delta_{PUCCH}$ equals 2 (18 resource indices).

FIG. 11 is a diagram depicting PUCCH 1/1a/1b resource allocation for normal CP, where $\Delta_{PUCCH}$ equals 2 (18 resource indices).

Figure 12:
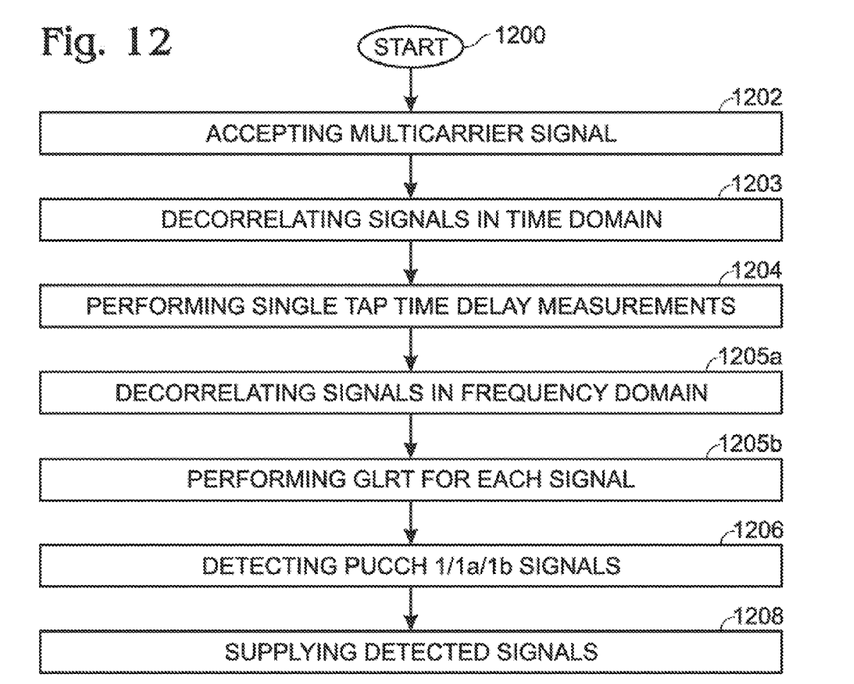
FIG. 12 is a flowchart illustrating a method for SC-FDMA PUCCH format 1/1a/1b detection in a wireless communications receiver.

FIG. 12 is a flowchart illustrating a method for SC-FDMA PUCCH format 1/1a/1b detection in a wireless communications receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Typically however, the steps are performed in numerical order. The method starts at Step 1200.

In Step 1202 a receiver accepts a plurality of multicarrier signals transmitted simultaneously from a plurality of transmitters, with overlapping carrier frequencies. For each multicarrier signal, Step 1204 performs a single tap measurement of time delay using a Direction of Arrival (DoA) technique. In response to the single tap measurements, Step 1206 detects PUCCH 1/1a/1b format signals, and Step 1208 supplies the detected PUCCH 1/1a/1b format signals for each multicarrier signal.

In one aspect, prior to performing the single tap measurements, Step 1203 decorrelates multicarrier signals in the time domain, using corresponding orthogonal code covers. In another aspect, subsequent to the single tap measurements, Step 1205a decorrelates each multicarrier signal in the frequency domain, using a corresponding cyclic shift. Subsequent to decorrelating the multicarrier signals in the frequency domain, Step 1205b performs a Generalized Likelihood Ratio Test (GLRT) for each decorrelated multicarrier signal using a DoA technique such as classis beamforming, Capon beamforming, MUltiple SIgnal Classification (MUSIC), estimation of signal parameters via rotational invariance techniques (ESPRIT), alternating projection, or simplified projection.

In one aspect, accepting the plurality of multicarrier signals in Step 1202 includes receiving a signal of one slot on the mth antenna, kth frequency tone, and ith SC-FDMA symbol as follows:

$$v_m(k,i) = \sum_{u=0}^{U-1} H_m^{(u)}(k,i) e^{j2\pi k \Delta_f (\Delta^{(u)} + \Delta_{cell}(i))/12} w^{(u)}(i) s^{(u)}(i) r_{rs}(k) + n_m(k,i)$$

where U is the number of multiplexed users;
$H_m^{(u)}(k,i)$ is the channel response on the kth tone of the uth user at the ith symbol on the mth antenna;
$\Delta_{cell}(i)$ is the cell specific cyclic shift on the ith symbol;
$r_{rs}(k)$ is the reference signal on the kth tone;
$\Delta_f$ is the subcarrier spacing, 15 KHz; and,
$w^{(u)}(i)$ is the orthogonal code on the ith symbol.

In another aspect, performing the single tap measurement includes in Step 1204 approximating each multicarrier signal as follows:

$$z_{m,n,data} = A_n H_{m,n} s_{data} + n_{m,n,data}$$

$$z_{m,n,pilot} = A_n H_{m,n} s_{pilot} + n_{m,n,pilot}$$

where $$A = \left[ a\left(\tau^{(u_0)} \Delta_f - \frac{\Delta^{(u_0)}}{12}\right), \ldots, a\left(\tau^{(u_{K-1})} \Delta_f - \frac{\Delta^{(u_{K-1})}}{12}\right) \right]$$

$$a(t) = [1 \; e^{-j2\pi t} \ldots e^{-j2\pi 11 t}]^T$$

where the subscript n denotes the index of the orthogonal code cover,
$u_0, \ldots, u_{K-1}$ are user indexes under the nth orthogonal code cover;
where A includes steering vectors corresponding to user $u_0, \ldots, u_{K-1}$;
where $H_{m,n}$ is a diagonal matrix whose elements are the single tap channel responses on the mth antenna of user $u_0, \ldots, u_{K-1}$;
where a(t) is a length 12 steering vector
where $\tau$ is a tap delay of a particular user
where $\Delta$ is a cyclic shift of a particular user;
where $s_{data}$ and $s_{pilot}$ are transmitted data and pilots, respectively, from user $u_0, \ldots, u_{K-1}$; and,
where $n_{m,n,data}$ and $n_{m,n,pilot}$ are interference and noise vectors on data symbols and pilot symbols, respectively, of the mth antenna and nth orthogonal code cover, respectively.

In one aspect, performing the GLRT for each decorrelated multicarrier signal in Step 1205b includes finding:

$$L = \log \frac{\max_{H, s_{pilot}=1, s_{data} \in \chi_S} P(Y|H, s_{pilot}, s_{data})}{p(Y|s_{pilot}=s_{data}=0)}$$

and, after simplification:

$$L = \max_{s_{pilot}=1, s_{data} \in \chi_S} \frac{\|Y^H S\|^2}{\|S\|^2 N_0}; \text{ and,}$$

and building for hypothesis tests $H_D$ and $H_{ND}$:

$$Y = SH + noise$$

where $$Y = \begin{bmatrix} y_{0,data,s_0}^{(u)} & \cdots & y_{M-1,data,s_0}^{(u)} & y_{0,data,s_1}^{(u)} & \cdots & y_{M-1,data,s_1}^{(u)} \\ y_{0,pilot,s_0}^{(u)} & \cdots & y_{M-1,data,s_0}^{(u)} & y_{0,data,s_1}^{(u)} & \cdots & y_{M-1,data,s_1}^{(u)} \end{bmatrix}$$

$$S = \begin{bmatrix} s_{data}^{(u)} \\ s_{pilot}^{(u)} \end{bmatrix}$$

$$H = [h_{0,s_0}^{(u)} \ldots h_{M-1,s_0}^{(u)} h_{0,s_1}^{(u)} \ldots h_{M-1,s_1}^{(u)}]$$

$$H_D : s_{pilot}^{(u)} = 0, s_{data}^{(u)} = 0$$

$$H_{ND} : s_{pilot}^{(u)} = 1, s_{data}^{(u)} \in \chi_s$$

where $y_{m,data,s_i}^{(u)}$ and $y_{m,pilot,s_i}^{(u)}$ are decorrelated data and pilot symbols on the mth antenna in slot i, respectively. Then, Step 1206 detects PUCCH 1/1a/1b signals as a discontinuous transmission (DTX) if L is less than a threshold $\gamma$.

In one variation, performing the single tap measurement using the DoA technique in Step 1204 includes using the classic beamforming algorithm by building statistics for slot pairs, including decoupled data and pilot signal from each antennas in each slot, as follows:

$$\tilde{Z}_n = [z_{0,n,pilot}, z_{1,n,pilot}, \ldots, z_{M-1,n,pilot}, \ldots, z_{0,n,data}, z_{1,n,data}, \ldots, z_{M-1,n,data}]$$

computing metrics $$\lambda_n^{(u)}(\tau) = \left\| \tilde{Z}_n a^H\left(\tau \Delta_f - \frac{\Delta^{(u)}}{12}\right) \right\|^2,$$

where a is the steering vector;
peak picking to estimate $\tau^{(u)}$ using computed spectrums from both slot within a given range $$\hat{\tau}^{(u)} = \arg\max_{\tau \in [\tau_{min}, \tau_{max}]} \lambda_{n_0, s_0}^{(u)}(\tau) + \lambda_{n_1, s_1}^{(u)}(\tau)$$

where the subscripts $s_0$ and $s_1$ represents slot 0 and slot 1, and $n_0$ and $n_1$ are user u's orthogonal code cover indexes in slot 0 and slot.

In another variation, performing the single tap measurement using the DoA technique includes using the alternating projection algorithm by building statistics for slot pairs, including decoupled data and pilot signal from each antennas in each slot, as follows:
for each user, set initial estimates to $\hat{\tau}^{(u)}$;
iteratively update each user's estimate $$\hat{\tau}^{(u)} = \arg\max_{\tau \in [\tau_{min}, \tau_{max}]} \lambda_{n_0, s_0}^{(u)}(\tau) + \lambda_{n_1, s_1}^{(u)}(\tau)$$

where the subscripts $s_0$ and $s_1$ represents slot 0 and slot 1, and $n_0$ and $n_1$ are user u's orthogonal code cover indexes in slot 0 and slot;

computing a spectrum, per slot, based on steering vectors projected onto the null space of $$\left\{ a\left(\tau^{(\tilde{u}_0)}\Delta_f - \frac{\Delta^{(\tilde{u}_0)}}{12}\right), \ldots, a\left(\tau^{(\tilde{u}_0)}\Delta_f - \frac{\Delta^{(\tilde{u}_{K-2})}}{12}\right)\right\}.$$

where $\tilde{u}_0, \ldots, \tilde{u}_{K-2}$ are all users under orthogonal cover n, but excluding u
given $$\tilde{A}_u = [a(\hat{\theta}_0), \ldots, a(\hat{\theta}_{u-1}), a(\hat{\theta}_{u+1}), \ldots, a(\hat{\theta}_{U-1})]$$

where $$\hat{\theta}_k = \hat{\tau}^{(k)}\Delta_f - \frac{\Delta^{(k)}}{12}$$

computing a projection matrix $$P_u = I - \tilde{A}_u(\tilde{A}_u^H \tilde{A}_u)^{-1}\tilde{A}_u^H$$

projecting and normalizing a steering vector $$b_u(\theta) = \frac{P_u a(\theta)}{\|P_u a(\theta)\|}$$

computing $$\lambda^{(u)}(\tau) = \left\| \check{Z}b_u^H\left(\tau\Delta_f - \frac{\Delta^{(u)}}{12}\right)\right\|^2$$

and updating $\hat{\tau}^{(u)}$
repeating the above-listed steps until a stopping criteria is met.

In another aspect, performing the single tap measurement using the DoA technique includes using the simplified projection algorithm by building statistics for slot pairs, including decoupled data and pilot signal from each antennas in each slot, as follows:
setting a common initial estimate for each user;
for each user, using the simplified projection method to estimate $\hat{\tau}^{(u)}$, given initial estimates $$b_u(\theta) = \frac{P_u a(\theta)}{\|P_u a(\theta)\|}$$

$$P_u = I - \tilde{A}_u(\tilde{A}_u^H \tilde{A}_u)^{-1}\tilde{A}_u^H$$

where $\tilde{A}_u$ has orthogonal rows and $\tilde{A}_u^H \tilde{A}^u$ is a simple identity matrix.

In one aspect, detecting PUCCH 1/1a/1b format signals in Step 1206 includes detecting signals for each user either consisting of both ACK/NACK and SR, or multiple ACK/NACKs, where no more than one non-DTX symbol can be sent over multiple allocations. Then, performing the GLRT for each decorrelated multicarrier signal in Step 1205b includes comparing the generalized likelihood ratios, selecting the maximum generalized likelihood ratio from all possible allocations, and comparing the maximum generalized likelihood ration to a threshold. If the maximum generalized likelihood ratio is less the threshold, all possible allocations are detected as DTX. Otherwise, the allocation corresponding to the maximum generalized likelihood ratio is detected as non DTX, and $s_{data}$ achieving the maximum generalized likelihood ratio is detected as the transmitted signal.

A system and method have been provided for PUCCH format 1/1a/1b signal detection. Particular mathematical algorithms have been presented as examples to illustrate the invention, but the invention is not necessarily limited to these examples. Other variations and embodiments of the invention will occur to those skilled in the art.

We claim:
1. In a wireless communications receiver, a method for Single Carrier-Frequency-Division Multiple Access (SC-FDMA) Physical Uplink Control Channel (PUCCH) format 1/1a/1b detection, comprising:
a receiver accepting a plurality of multicarrier signals transmitted simultaneously from a plurality of transmitters, with overlapping carrier frequencies;
for each multicarrier signal comprised in the plurality of multicarrier signals, performing a single tap measurement of time delay using a Direction of Arrival (DoA) technique;
in response to the single tap measurement, detecting a PUCCH 1/1a/1b format signal; and,
supplying the PUCCH 1/1a/1b format signal for each multicarrier signal.
2. The method of claim 1, further comprising:
prior to performing the single tap measurement, decorrelating each multicarrier signal in the time domain, using corresponding an orthogonal code cover.
3. The method of claim 2, further comprising:
subsequent to the single tap measurement, decorrelating each multicarrier signal in the frequency domain, using a corresponding cyclic shift.
4. The method of claim 3, further comprising:
subsequent to decorrelating the multicarrier signal in the frequency domain, performing a Generalized Likelihood Ratio Test (GLRT) for each decorrelated multicarrier signal in the frequency domain.
5. The method of claim 4, wherein performing the GLRT for each multicarrier signal in the frequency domain comprises finding:

$$L = \log \frac{\max_{H, s_{pilot}=1, s_{data} \in \chi_S} p(Y|H, s_{pilot}, s_{data})}{p(Y|s_{pilot} = s_{data} = 0)}$$

and, after simpilification:

$$L = \max_{s_{pilot}=1, s_{data} \in \chi_S} \frac{\|Y^H S\|^2}{\|S\|^2 N_0}; \text{ and,}$$

and building for hypothesis tests $H_D$ and $H_{ND}$:

$$Y = SH + \text{noise}$$

where $$Y = \begin{bmatrix} y_{0,data,s_0}^{(u)} & \cdots & y_{M-1,data,s_0}^{(u)} & y_{0,data,s_1}^{(u)} & \cdots & y_{M-1,data,s_1}^{(u)} \\ y_{0,pilot,s_0}^{(u)} & \cdots & y_{M-1,data,s_0}^{(u)} & y_{0,data,s_1}^{(u)} & \cdots & y_{M-1,data,s_1}^{(u)} \end{bmatrix}$$

-continued $$S = \begin{bmatrix} s_{data}^{(u)} \\ s_{pilot}^{(u)} \end{bmatrix}$$

$$H = [h_{0,s_0}^{(u)} \ldots h_{M-1,s_0}^{(u)} h_{0,s_1}^{(u)} \ldots h_{M-1,s_1}^{(u)}]$$

$$H_D: s_{pilot}^{(u)} = 0, s_{data}^{(u)} = 0$$

$$H_{ND}: s_{pilot}^{(u)} = 1, s_{data}^{(u)} \in \chi_s$$

where $y_{m,data,s_i}^{(u)}$ and $y_{m,pilot,s_i}^{(u)}$ are data and pilot symbols on the mth antenna in slot i, respectively; and, wherein detecting the PUCCH signal comprises detecting a PUCCH 1/1a/1b signal as a discontinuous transmission (DTX) if L is less than a threshold γ, otherwise $s_{data}$ achieving a maximum L is detected as a transmitted signal.

6. The method of claim 4, wherein detecting the PUCCH 1/1a/1b format signal comprises detecting signals for each user selected from a group consisting of both ACK/NACK and SR, and multiple ACK/NACKs, where no more than one non-DTX symbol can be sent over multiple allocations; and,
wherein detecting the PUCCH 1/1a/1b format signal further comprises comparing generalized likelihood ratios, selecting a maximum generalized likelihood ratio from all possible GLRT computed allocations, and comparing the maximum generalized likelihood ratio to a threshold, and if the maximum generalized likelihood ratio is less the threshold, all possible allocations are detected as DTX, otherwise allocations corresponding to the maximum generalized likelihood ratio are detected as non DTX, and transmitted data for each user achieving the maximum generalized likelihood ratio is detected as the transmitted signal.

7. The method of claim 1, wherein performing the single tap measurement using the DoA technique comprises using a DoA technique selected from a group consisting of classic beamforming, Capon beamforming, MUltiple SIgnal Classification (MUSIC), estimation of a signal parameter via a rotational invariance technique (ESPRIT), alternating projection, and simplified projection.

8. The method of claim 7, wherein performing the single tap measurement using the DoA technique comprises using the classic beamforming algorithm by building statistics for slot pairs, including decoupled data and pilot signal from each antenna in each slot, as follows:

$$\tilde{Z}_n = [z_{0,n,pilot}, z_{1,n,pilot}, \ldots, z_{M-1,n,pilot}, \ldots, z_{0,n,data}, z_{1,n,data}, \ldots, z_{M-1,n,data}]$$

computing metrics $$\lambda_n^{(u)}(\tau) = \left\| \tilde{Z}_n a^H \left( \tau \Delta_f - \frac{\Delta^{(u)}}{12} \right) \right\|^2,$$

, where a is the steering vector;
peak picking to estimate $\tau^{(u)}$ using computed spectrums from both slot within a given range $$\hat{\tau}^{(u)} = \arg \max_{\tau \in [\tau_{min}, \tau_{max}]} \lambda_{n_0,s_0}^{(u)}(\tau) + \lambda_{n_1,s_1}^{(u)}(\tau)$$

where the subscripts $s_0$ and $s_1$ represents slot 0 and slot 1, and $n_0$ and $n_1$ are user u's orthogonal code cover indexes in slot 0 and slot 1.

9. The method of claim 7, wherein performing the single tap measurement using the DoA technique comprises using the alternating projection algorithm by building statistics for slot pairs, comprising decoupled data and pilot signal from each antenna in each slot, as follows:
for each user, setting initial estimates to $\hat{\tau}^{(u)}$;
iteratively update each user's estimate $$\hat{\tau}^{(u)} = \arg \max_{\tau \in [\tau_{min}, \tau_{max}]} \lambda_{n_0,s_0}^{(u)}(\tau) + \lambda_{n_1,s_1}^{(u)}(\tau)$$

where the subscripts $s_0$ and $s_1$ represents slot 0 and slot 1, and $n_0$ and $n_1$ are user u's orthogonal code cover indexes in slot 0 and slot;
computing a spectrum, per slot, based on steering vectors projected onto the null space of $$\left\{ a\left(\tau^{(\tilde{u}_0)} \Delta_f - \frac{\Delta^{(\tilde{u}_0)}}{12}\right), \ldots, a\left(\tau^{(\tilde{u}_0)} \Delta_f - \frac{\Delta^{(\tilde{u}_{K-2})}}{12}\right) \right\}$$

where $\tilde{u}_0, \ldots, \tilde{u}_{K-2}$ are all users under orthogonal cover n, given but excluding u $$\tilde{A}_u = [a(\hat{\theta}_0), \ldots, a(\hat{\theta}_{u-1}), a(\hat{\theta}_{u+1}), \ldots, a(\hat{\theta}_{U-1})]$$

where $\hat{\theta}_k = \hat{\tau}^{(k)} \Delta_f - \frac{\Delta^{(k)}}{12}$ computing a projection matrix $$P_u = I - \tilde{A}_u (\tilde{A}_u^H \tilde{A}_u)^{-1} \tilde{A}_u^H$$

projecting and normalizing a steering vector
computing $$b_u(\theta) = \frac{P_u a(\theta)}{\|P_u a(\theta)\|}$$

and updating $$\lambda^{(u)}(\tau) = \left\| \tilde{Z} b_u^H \left( \tau \Delta_f - \frac{\Delta^{(u)}}{12} \right) \right\|^2$$

$$\hat{\tau}^{(u)}$$

repeating the above-listed steps until a stopping criteria is met.

10. The method of claim 7, wherein performing the single tap measurement using the DoA technique comprises using the simplified projection algorithm by building statistics for slot pairs, comprising decoupled data and pilot signal from each antenna in each slot, as follows:
setting a common initial estimate for each user;
for each user, using the simplified projection method to estimate $\hat{\tau}^{(u)}$, given initial estimates $$b_u(\theta) = \frac{P_u a(\theta)}{\|P_u a(\theta)\|}$$

$$P_u = I - \tilde{A}_u (\tilde{A}_u^H \tilde{A}_u)^{-1} \tilde{A}_u^H$$

where $\tilde{A}_u$ has orthogonal rows and $\tilde{A}_u^H \tilde{A}_u$ is a simple identity matrix.

11. The method of claim 1, wherein performing the single tap measurement comprises approximating each multicarrier signal as follows:

$$z_{m,n,data} = A_n H_{m,n} s_{data} + n_{m,n,data}$$

$$z_{m,n,pilot} = A_n H_{m,n} s_{pilot} + n_{m,n,pilot}$$

where $$A = \left[ a\left(\tau^{(u_0)} \Delta_f - \frac{\Delta^{(u_0)}}{12}\right), \ldots, a\left(\tau^{(u_{K-1})} \Delta_f - \frac{\Delta^{(u_{K-1})}}{12}\right) \right]$$

$$a(t) = [1 \ e^{-j2\pi t} \ldots e^{-j2\pi 11 t}]^T$$

where the subscript n denotes the index of the orthogonal code cover,
$u_0, \ldots, u_{K-1}$ are user indexes under the nth orthogonal code cover;
where A includes steering vectors corresponding to user $u_0, \ldots, u_{K-1}$;
where $H_{m,n}$ is a diagonal matrix whose elements are the single tap channel responses on the mth antenna of user $u_0, \ldots, u_{K-1}$;
where a(t) is a length 12 steering vector
where τ is a tap delay of a particular user
where Δ is a cyclic shift of a particular user;
where $s_{data}$ and $s_{pilot}$ are transmitted data and pilots, respectively, from user $u_0, \ldots, u_{K-1}$; and,
where $n_{m,n,data}$ and $n_{m,n,pilot}$ are interference and noise vectors on data symbols and pilot symbols, respectively, of the mth antenna and nth orthogonal code cover, respectively.

12. A wireless communications receiver with a system for Single Carrier-Frequency-Division Multiple Access (SC-FDMA) Physical Uplink Control Channel (PUCCH) format 1/1a/1b detection, the system comprising:
a plurality of antennas accepting a plurality of multicarrier signals transmitted simultaneously from a plurality of transmitters, with overlapping carrier frequencies;
a plurality of pre-processing modules, each of the plurality of pre-processing modules connected to a corresponding antenna of the plurality of antennas to perform cyclic prefix (CP) removal and a fast Fourier transform (FFT) for each multicarrier signal of the plurality of multicarrier signals;
a resource demapping module connected to the pre-processing modules and having an output connected to a PUCCH receiver;
the PUCCH receiver comprising:
a plurality of compensation modules, for compensating cyclic shift and reference frequency;
a plurality of time domain decorrelators, each of the plurality of time domain decorrelators connected to a corresponding compensation module of the plurality of compensation modules;
a plurality of single tap time delay estimators, each of the plurality of single tap time delay estimators connected to a corresponding time domain decorrelator of the plurality of time domain decorrelators, each single tap time delay estimator of the plurality of single tap time delay estimators performing a single tap measurement of time delay for a corresponding multicarrier signal using a Direction of Arrival (DoA) technique;
a plurality of frequency domain decorrelators, each of the plurality of frequency domain decorrelators connected to a corresponding single tap time delay estimator of the plurality of single tap time delay estimators;
a plurality of Generalized Likelihood Ratio Test (GLRT) modules, each of the plurality of GLRT modules connected to a corresponding frequency domain decorrelator of the frequency domain decorrelators; and,
a post-processing module connected to each GLRT module of the plurality of GLRT modules and having an output to supply detected PUCCH 1/1a/1b format signals.

13. The system of claim 12, wherein each time domain decorrelator of the plurality of time domain decorrelators decorrelates a resource block (RB) pair, associated with a corresponding multicarrier signal, in the time domain, using a corresponding orthogonal code cover.

14. The system of claim 13, wherein each frequency domain decorrelator of the frequency domain decorrelators decorrelates a corresponding RB pair in the frequency domain, using a corresponding cyclic shift.

15. The system of claim 12, wherein each single tap time delay estimator of the plurality of single tap time delay estimators uses a DoA technique comprising classis beamforming, Capon beamforming, MUltiple SIgnal Classification (MUSIC), estimation of signal parameters via rotational invariance techniques (ESPRIT), alternating projection, or simplified projection.

16. The system of claim 15, wherein each single tap time delay estimator uses the classic beamforming algorithm by building statistics for slot pairs, using decoupled data and pilot signal from a corresponding antenna of the plurality of antennas, as follows:

$$\tilde{Z}_n = [z_{0,n,pilot}, z_{1,n,pilot}, \ldots, z_{M-1,n,pilot}, \ldots, z_{0,n,data}, z_{1,n,data}, \ldots, z_{M-1,n,data}]$$

computing metrics $$\lambda_n^{(u)}(\tau) = \left\| \tilde{Z}_n a^H \left( \tau \Delta_f - \frac{\Delta^{(u)}}{12} \right) \right\|^2,$$

where a is the steering vector;
peak picking to estimate $\tau^{(u)}$ using computed spectrums from both slot within a given range $$\hat{\tau}^{(u)} = \arg\max_{\tau \in [\tau_{min}, \tau_{max}]} \lambda_{n_0, s_0}^{(u)}(\tau) + \lambda_{n_1, s_1}^{(u)}(\tau)$$

where the subscripts $s_0$ and $s_1$ represents slot 0 and slot 1, and $n_0$ and $n_1$ are user u's orthogonal code cover indexes in slot 0 and slot.

17. The system of claim 15, wherein each single tap time delay estimator of the plurality of single tap delay estimators uses the alternating projection algorithm by building statistics a corresponding slot pairs, using decoupled data and pilot signal from a corresponding antenna of the plurality of antennas, as follows:

for each user, setting initial estimates to $\hat{\tau}^{(u)}$;
iteratively update each user's estimate $$\hat{\tau}^{(u)} = \arg\max_{\tau \in [\tau_{min}, \tau_{max}]} \lambda^{(u)}_{n_0, s_0}(\tau) + \lambda^{(u)}_{n_1, s_1}(\tau)$$

where the subscripts $s_0$ and $s_1$ represents slot 0 and slot 1, and $n_0$ and $n_1$ are user u's orthogonal code cover indexes in slot 0 and slot;
computing a spectrum, per slot, based on steering vectors projected onto the null space of $$\left\{ a\left\{\tau^{(\tilde{u}_0)}\Delta_f - \frac{\Delta^{(\tilde{u}_0)}}{12}\right\}, \ldots, a\left(\tau^{(\tilde{u}_0)}\Delta_f - \frac{\Delta^{(\tilde{u}_{K-2})}}{12}\right)\right\}$$

where $\tilde{u}_0, \ldots, \tilde{u}_{K-2}$ are all users under orthogonal cover n, given but excluding u
$\tilde{A}_u = [a(\hat{\theta}_0), \ldots, a(\hat{\theta}_{u-1}), a(\hat{\theta}_{u+1}), \ldots, a(\hat{\theta}_{U-1})]$ where $\hat{\theta}_k = \hat{\tau}^{(k)}\Delta_f - \frac{\Delta^{(k)}}{12}$ computing a projection matrix
$P_u = I - \tilde{A}_u(\tilde{A}_u^H \tilde{A}_u)^{-1}\tilde{A}_u^H$
projecting and normalizing a steering vector $$b_u(\theta) = \frac{P_u a(\theta)}{\|P_u a(\theta)\|}$$

computing $$\lambda^{(u)}(\tau) = \left\| \tilde{Z} b_u^H\left(\tau\Delta_f - \frac{\Delta^{(u)}}{12}\right)\right\|^2$$

and updating $\hat{\tau}^{(u)}$; and,
repeating the above-listed steps until a stopping criteria is met.

18. The system of claim 15, wherein each single tap time delay estimator of the plurality of single tap time delay estimators uses the simplified projection algorithm by building statistics for a corresponding slot pair, using decoupled data and pilot signal from a corresponding antenna of the plurality of antennas, as follows:
setting a common initial estimate for each user;
for each user, using the simplified projection method to estimate $\hat{\tau}^{(u)}$, given initial estimates $$b_u(\theta) = \frac{P_u a(\theta)}{\|P_u a(\theta)\|}$$

$P_u = I - \tilde{A}_u(\tilde{A}_u^H \tilde{A}_u)^{-1}\tilde{A}_u^H$ where $\tilde{A}_u$ has orthogonal rows and $\tilde{A}_u^H \tilde{A}_u$ is a simple identity matrix.

19. The system of claim 12, wherein each mth antenna is assigned to a signal of one slot on the mth antenna, kth frequency tone, and ith SC-FDMA symbol as follows:

$$v_m(k, i) = \sum_{u=0}^{U-1} H_m^{(u)}(k, i) e^{j2\pi k \Delta_f (\Delta^{(u)} + \Delta_{cell}(i))/12} w^{(u)}(i) s^{(u)}(i) r_{rs}(k) + n_m(k, i)$$

where U is the number of multiplexed users;
$H_m^{(u)}(k,i)$ is the channel response on the kth tone of the uth user at the ith symbol on the mth antenna;
$\Delta_{cell}(i)$ is the cell specific cyclic shift on the ith symbol;
$r_{rs}(k)$ is the reference signal on the kth tone;
$\Delta_f$ is the subcarrier spacing, 15 KHz; and,
$w^{(u)}(i)$ is the orthogonal code on the ith symbol.

20. The system of claim 12, wherein each single tap time delay estimator of the plurality of single tap time delay estimators approximates a multicarrier signal as follows:

$$z_{m,n,data} = A_n H_{m,n} s_{data} + n_{m,n,data}$$

$$z_{m,n,pilot} = A_n H_{m,n} s_{pilot} + n_{m,n,pilot}$$

where $$A = \left[a\left(\tau^{(u_0)}\Delta_f - \frac{\Delta^{(u_0)}}{12}\right), \ldots, a\left(\tau^{(u_{K-1})}\Delta_f - \frac{\Delta^{(u_{K-1})}}{12}\right)\right]$$

$$a(t) = [1 \; e^{-j2\pi t} \ldots e^{-j2\pi 11 t}]^T$$

where the subscript n denotes the index of the orthogonal code cover,
$u_0, \ldots, u_{K-1}$ are user indexes under the nth orthogonal code cover;
where A includes steering vectors corresponding to user $u_0, \ldots, u_{K-1}$;
where $H_{m,n}$ is a diagonal matrix whose elements are the single tap channel responses on the mth antenna of user $u_0, \ldots, u_{K-1}$;
where a(t) is a length 12 steering vector
where $\tau$ is a tap delay of a particular user
where $\Delta$ is a cyclic shift of a particular user;
where $s_{data}$ and $s_{pilot}$ are transmitted data and pilots, respectively, from user $u_0, \ldots, u_{K-1}$; and,
where $n_{m,n,data}$ and $n_{m,n,pilot}$ are interference and noise vectors on data symbols and pilot symbols, respectively, of the mth antenna and nth orthogonal code cover, respectively.

21. The system of claim 12, wherein each GLRT module in the plurality of GLRT modules calculates as follows:

$$L = \log \frac{\max_{H, s_{pilot}=1, s_{data} \in \chi_S} p(Y \mid H, s_{pilot}, s_{data})}{p(Y \mid s_{pilot} = s_{data} = 0)}$$

and, after simplification:

$$L = \max_{s_{pilot}=1, s_{data} \in \chi_S} \frac{\|Y^H S\|^2}{\|S\|^2 N_0}; \text{ and,}$$

wherein each GLRT module of the plurality of GLRT modules computes for hypothesis tests $H_D$ and $H_{ND}$:

$$Y = SH + \text{noise}$$

where $$Y = \begin{bmatrix} y^{(u)}_{0,data,s_0} & \cdots & y^{(u)}_{M-1,data,s_0} & y^{(u)}_{0,data,s_1} & \cdots & y^{(u)}_{M-1,data,s_1} \\ y^{(u)}_{0,pilot,s_0} & \cdots & y^{(u)}_{M-1,data,s_0} & y^{(u)}_{0,data,s_1} & \cdots & y^{(u)}_{M-1,data,s_1} \end{bmatrix}$$

$$S = \begin{bmatrix} s^{(u)}_{data} \\ s^{(u)}_{pilot} \end{bmatrix}$$

$$H = [h_{0,s_0}{}^{(u)} \ldots h_{M-1,s_0}{}^{(u)} \; h_{0,s_1}{}^{(u)} \ldots h_{M-1,s_1}{}^{(u)}]$$

$$H_D : s_{pilot}{}^{(u)} = 0, \; s_{data}{}^{(u)} = 0$$

$$H_{ND} : s_{pilot}{}^{(u)} = 1, \; s_{data}{}^{(u)} \in \chi_s$$

where $Y_{m,data,s_i}{}^{(u)}$ and $y_{m,pilot,s_i}{}^{(u)}$ are decorrelated data and pilot symbols on the mth antenna in slot i, respectively; and, wherein the post-processing module detects PUCCH 1/1a/1b signals as a discontinuous transmission (DTX) if L is less than a threshold γ, otherwise $s_{data}$ achieving the maximum L is detected as the transmitted signal.

22. The system of claim 12, wherein the post-processing module detects signals for each user selected from a group consisting of both ACK/NACK and SR, and multiple ACK/NACKs, where no more than one non-DTX symbol can be sent over multiple allocations; and, wherein the post-processing module compares generalized likelihood ratios, selects the maximum generalized likelihood ratio from all possible allocations computed by the GLRT modules, and compares the maximum generalized likelihood ratio to a threshold, and if the maximum generalized likelihood ratio is less the threshold, all possible allocations are detected as DTX, otherwise allocations corresponding to the maximum generalized likelihood ratio are detected as non DTX, and $s_{data}$ achieving the maximum generalized likelihood ratio is detected as the transmitted signal.

23. In a wireless communications receiver, a method for Single Carrier-Frequency-Division Multiple Access (SC-FDMA) Physical Uplink Control Channel (PUCCH) format 1/1a/1b detection, comprising:

accepting a plurality of multicarrier signals transmitted simultaneously from a plurality of transmitters, with overlapping carrier frequencies;

for each multicarrier signal, performing a single tap measurement of time delay using a Direction of Arrival (DoA) technique;

in response to the single tap measurement for each multicarrier signal, detecting PUCCH 1/1a/1b format signals; and, supplying the detected PUCCH 1/1a/1b format signals for each multicarrier signal.

* * * * *